US012123801B2

(12) United States Patent
Cantadori

(10) Patent No.: US 12,123,801 B2
(45) Date of Patent: Oct. 22, 2024

(54) ADAS CALIBRATION SYSTEM FOR CALIBRATING AT LEAST ONE HEADLAMP OF A VEHICLE

(71) Applicant: MAHLE International GmbH, Stuttgart (DE)

(72) Inventor: Andrea Cantadori, Stuttgart (DE)

(73) Assignee: MAHLE International GmbH, Stuttgart (DE)

( * ) Notice: Subject to any disclaimer, the term of this patent is extended or adjusted under 35 U.S.C. 154(b) by 150 days.

(21) Appl. No.: 18/003,112

(22) PCT Filed: Jul. 21, 2021

(86) PCT No.: PCT/IB2021/056595
§ 371 (c)(1),
(2) Date: Dec. 22, 2022

(87) PCT Pub. No.: WO2022/023888
PCT Pub. Date: Feb. 3, 2022

(65) Prior Publication Data
US 2023/0251162 A1 Aug. 10, 2023

(30) Foreign Application Priority Data

Jul. 28, 2020 (EP) .................................. 20188051

(51) Int. Cl.
*G01M 11/06* (2006.01)
(52) U.S. Cl.
CPC ........ *G01M 11/064* (2013.01); *G01M 11/061* (2013.01); *G01M 11/067* (2013.01)
(58) Field of Classification Search
CPC .................................................. G01M 11/064
See application file for complete search history.

(56) References Cited

U.S. PATENT DOCUMENTS 3,841,759 A   10/1974   Turner
2007/0089308 A1   4/2007   Jeon
(Continued)

FOREIGN PATENT DOCUMENTS

EP   3628996 A1   9/2019
GB   2307312 A    5/1997
WO   2018167809 A1   9/2018

OTHER PUBLICATIONS

International Search Report and Written Opinion as issued in connection with International Patent Application No. PCT/IB2021/056595, dated Apr. 10, 2022.

*Primary Examiner* — Hina F Ayub
(74) *Attorney, Agent, or Firm* — Maschoff Brennan

(57) ABSTRACT

An ADAS calibration system for calibrating at least one headlamp of a vehicle. The ADAS calibration system including a support; optical measurement device mounted on the support for detecting the distances of two front or rear wheels of the vehicle from the support; a projection surface mounted on the support; and at least one headlamp beam setter. The headlamp beam setter includes a screen configured to show a pattern created by the two-dimensional projection of the light beam emitted by the headlamp and a camera configured to acquire images of the pattern shown on the screen. The ADAS calibration system also includes a control unit configured to receive from the optical measurement device the distances detected and from the camera the images of the pattern and, in response to them, to compute an alignment angle for the headlamp.

16 Claims, 2 Drawing Sheets

(56) References Cited

U.S. PATENT DOCUMENTS

2012/0224171 A1 9/2012 Yotz et al.
2020/0074767 A1* 3/2020 Cavalli ................ G01M 11/067

* cited by examiner

ADAS CALIBRATION SYSTEM FOR CALIBRATING AT LEAST ONE HEADLAMP OF A VEHICLE

FIELD

The present invention relates to an ADAS calibration system for calibrating at least one headlamp of a vehicle.

BACKGROUND

An important safety aspect in traffic is to have correctly adjusted headlamps in order to provide good illumination of the road with the lowest possible glare to the oncoming traffic.

A headlamp beam setter or tester is an instrument used during a vehicle inspection to check both the orientation and intensity of the light emitted by vehicle headlamps A known headlamp beam setter is in the form of a movable trolley including a height-adjustable optical group, that is slidably mounted on a vertical column which is aligned with the headlamp of the vehicle, so as to receive a collimated light beam and a mirror or laser alignment system mounted on the top of the vertical column, which allows the alignment of the setter with the longitudinal axis of the vehicle.

The optical group includes a series of lens that are configured to focus the light beam of all types of headlamps.

Usually the trolley has a T-shaped or L-shaped base equipped with three wheels in order to position the headlamp beam setter in front of the headlamp to check.

In some applications, the wheels of the trolley can slide on rails placed on the floor in front of the vehicle.

With the spreading of LED headlamps in the last years, recent models of headlamp beam setters have been equipped with a camera for capturing images and with an electronic unit for digital processing of the images (light pattern), i.e. filtering or enhancing definition.

In practice, the light beam coming from the headlamp is directed to the digital camera of the headlamp beam setter, the electronic unit processes the acquired image and commands the display of the exact pointing position and the shape of the light beam, so that it may be verified and adjusted.

One issue of the known solution is that the mechanic preforms the adjustment of the headlamp by empirically using the longitudinal axis or the thrust axis of the vehicle as target for alignment. This requires additional tools, such as laser beams or pointers for the identification of target points on the vehicle bodywork.

In addition, the known solutions envisage sophisticated operating system and software applications with databases containing specifications for different models of vehicles.

Furthermore, the adjustment of the headlamp beam setter is a long operation for the mechanic, that is often affected by positioning errors.

Over recent years, the attention of those developing the safety of motor vehicles has extended from the traditional passive safety systems (airbags, seat belts, impact resistance, etc.) to advanced active safety systems, known to specialists as ADAS (Advanced Driver Assistance Systems).

ADAS systems are electronic driving assistance systems for vehicles that support the driver for the purpose of increasing safety and/or driving comfort.

By way of example, ADAS systems that are already widespread include adaptive cruise control, automatic full-beam headlamp adjustment, automatic headlamp orientation, automatic parking system, navigation system with traffic information, night vision system, blind spot monitor, frontal collision warning system, automatic emergency braking, etc.

At technological level, ADAS systems are based on a plurality of sensors (television cameras, radar, Lidar, etc.) able to detect different information that can possibly be used as the input data for a smart algorithm that oversees the degree of autonomy of the vehicle.

Before the vehicle is placed on the market, the sensors are calibrated directly by the manufacturer.

For example, the initial calibration of a camera is performed through a simulation environment specifically provided by the manufacturer in which the camera is placed opposite a monitor onto which settable dynamic scenarios are projected (e.g. a pedestrian crossing the road).

After the vehicle has been placed on the market, the sensors are calibrated periodically (e.g. when the vehicle is serviced) or after exceptional events (e.g. replacement of the sensor following a defect, damage or breakdown warning).

The Applicant has recently developed an ADAS calibration system and method for calibrating an optical sensor mounted on board of a vehicle, as disclosed in the European patent application published as EP 3588001. The system is completely digital since it employs a screen or panel to project the images/videos associated to a specific optical sensor to be calibrated.

It must also be pointed out that modern headlamps formed by an active LED matrix are connected to the ADAS calibration systems of the vehicle, in particular to the frontal camera placed on board of the vehicle, for adapting the intensity and/or orientation of the light beam to the traffic conditions.

Document EP 3 628 996 A1, according to its abstract, discloses a vehicle headlight measurement system instrumentation structure, comprising: a support structure; a vehicle calibration assistance structure, which is carried by the support structure and includes a headlight aiming device; a positioning target element, having a surface provided with a predetermined graphical feature, the positioning target element being supported by the support structure and oriented in a forward direction towards the service area; a positioning device, configured for aiding a relative positioning between the vehicle and the vehicle calibration assistance structure; a processing system which is operatively connected to the positioning device.

Document US 2012/224171 A1 proposes, according to its abstract, a vehicle headlight aiming apparatus including a housing that is vertically and horizontally adjustable along vertical and horizontal tracks. The housing includes a lens for receiving and focusing a headlight beam of a vehicle and forming an image on an internal screen, and a control unit mounted on the housing that is vertically and horizontally pivotable relative to the housing. The housing and the control unit each emit laser beams to configure and measure an alignment of the apparatus to the vehicle. The control unit compensates for an unlevel supporting surface of the apparatus and/or the vehicle and indicates whether the headlight is properly aimed according to a selected aiming standard based on the image, the configuration of the vehicle and the apparatus, and any compensation of any unlevel supporting surface(s) of the apparatus and/or the vehicle.

Document GB 2 307 312 A discloses, according to its abstract, an apparatus and method for aiming a vehicle headlight to a standard image pattern including a frame movable relative to the vehicle. A housing carried on a vertically adjustable housing includes a lens focusing a headlight beam onto a reflective screen which reflects the beam image to a camera. A control compares areas of the digitized image output from the camera with a standard image pattern and generates a correlation factor based on the difference between the reflected image and a standard image. Based on the difference, the control generates output signals to an adjustment device engagable with the headlight mounting frame to adjust the position of the mounting frame to reduce the difference to zero.

SUMMARY

In this context, an object of the present invention is to propose an ADAS calibration system for calibrating at least one headlamp of a vehicle, which outweigh the drawbacks of the prior art mentioned above.

In particular, an object of the present invention is to propose an ADAS calibration system for calibrating at least one headlamp of a vehicle, which is easier and quicker to use than the known solutions.

Another object of the present invention is to provide an ADAS calibration system for calibrating at least one headlamp of a vehicle, that is more reliable than the known solutions.

The stated technical task and specified objects are substantially achieved by an ADAS calibration system for calibrating at least one headlamp of a vehicle, the ADAS calibration system comprising: a support; optical measurement device configured to detect the distances of two front or rear wheels of the vehicle from the support, the optical measurement device being mounted on the support; a projection surface for projecting images or videos, the projection surface being mounted on the support; at least one headlamp beam setter comprising a screen configured to show a pattern created by the two-dimensional projection of the light beam emitted by the headlamp substantially arranged in front of the headlamp beam setter, and a camera configured to acquire images of the pattern shown on the screen; a control unit configured to receive from the optical measurement device the distances detected for the two wheels and from the camera the images of the pattern and, in response to them, to compute an alignment angle for the headlamp.

According to one embodiment, the headlamp beam setter is mounted on the support and horizontally slidable thereon.

In one aspect of the invention, the support comprises a horizontal bar on which the headlamp beam setter is slidably mounted along a first predefined direction.

Preferably, the horizontal bar is slidable along a second predefined direction that is transverse to the first predefined direction.

According to another embodiment, the headlamp beam setter is arranged on a further support that is separated from the support, that means that the support and the further support are not integrally connected.

According to another embodiment, there are two headlamp beam setters mounted on the support.

Preferably, the two headlamp beam setters are mounted on a horizontal bar of the support.

According to one embodiment, the camera is located in front of the screen with respect to the light beam emitted by the headlamp.

According to another embodiment, the camera is located behind the screen with respect to the light beam emitted by the headlamp.

According to one embodiment, the headlamp beam setter further comprises at least one lens for focusing the light beam coming from the headlamp before reaching the screen.

According to one embodiment, the screen, the camera and the lens (when present) are housed in a box.

According to an aspect of the invention, the camera is located in a lower position or in a higher position with respect to the optical axis the lens.

According to one embodiment, the optical measurement device comprise two laser meters slidably mounted on the support.

According to another embodiment, the optical measurement device comprise two cameras mounted on the support.

According to one aspect of the invention, the control unit is also configured to command the projection of images or videos for the calibration of one or more optical sensors placed on board of the vehicle.

For example, the projection surface is a screen or a panel.

Preferably, the control unit is configured to communicate with an EOBD diagnostic socket of the vehicle either wireless or via cable connection.

BRIEF DESCRIPTION OF THE DRAWINGS

Further characteristics and advantages of the present invention will more fully emerge from the non-limiting description of a preferred but not exclusive embodiment of an ADAS calibration system for calibrating at least one headlamp of a vehicle, as illustrated in the accompanying drawings, in which.

DESCRIPTION OF EMBODIMENTS

Figure 1:
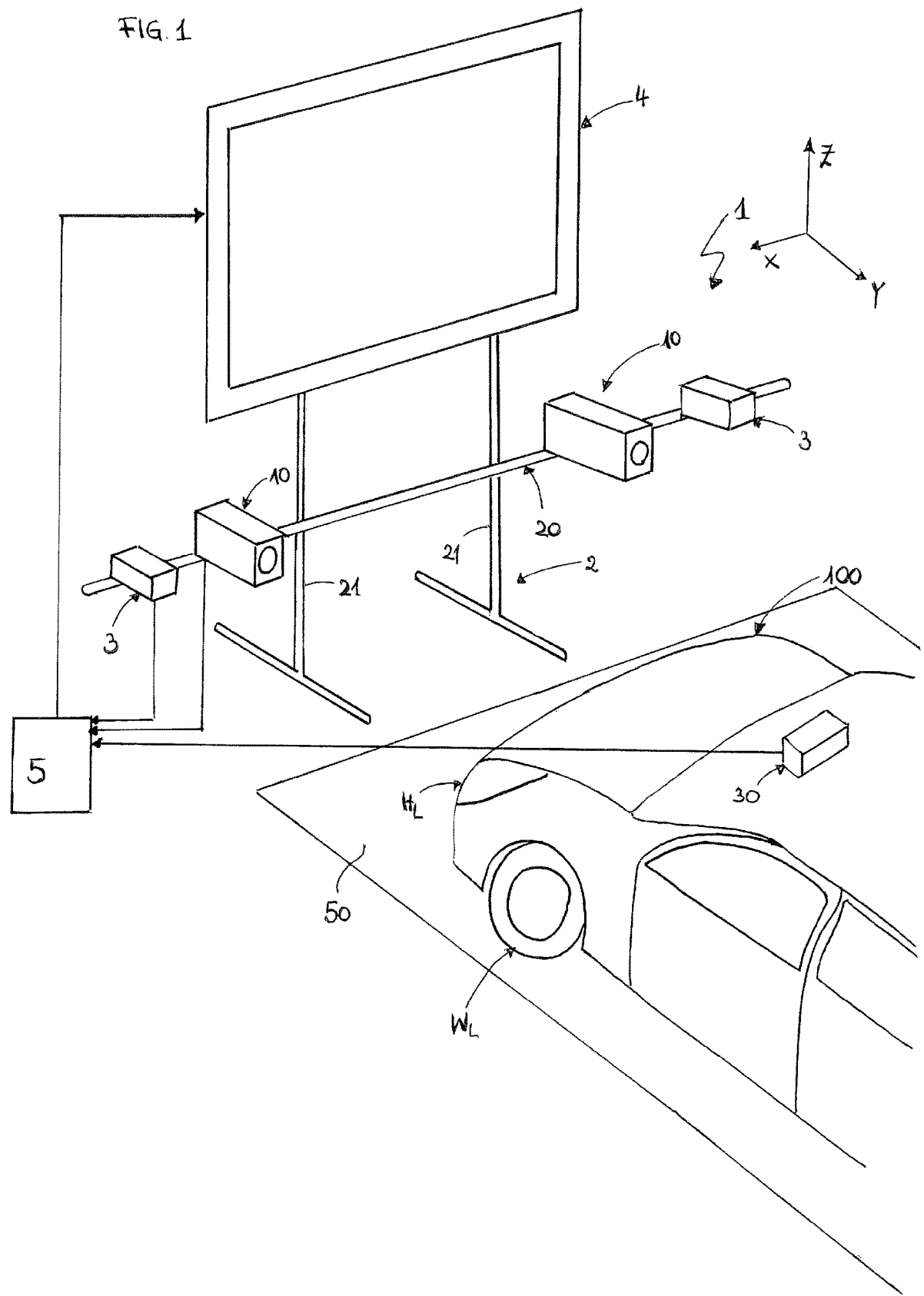
FIG. 1 schematically illustrates an ADAS calibration system for calibrating at least one headlamp of a vehicle, according to the present invention.

With reference to the figures, the number 1 indicates an ADAS calibration system for calibrating at least one headlamp HL of a vehicle 100.

In particular, the vehicle 100 is placed in a test station 50 consisting of a horizontal or inclined floor on which the stationary vehicle 100 is parked.

For example, the vehicle 100 is a motor vehicle such as a car, a bus, a lorry, a road tractor, a tractor trailer, a farm machinery, a working vehicle, a self-propelled vehicle, etc.

The ADAS calibration system 1 comprises a support 2 that is preferably movable, i.e. by means of wheels, in order to be positioned in front of the vehicle 100 located in the test station 50.

The ADAS calibration system 1 comprises at least one headlamp beam setter 10.

According to one embodiment, the headlamp beam setter 10 is mounted on the support 2 and is horizontally slidable thereon. In practice, the headlamp beam setter 10 can slide according to a first predefined direction X that is substantially transverse with respect to a pointing direction Y of the headlamp HL.

Preferably, the support 2 comprises a horizontal bar 20 on which the headlamp beam setter 10 is slidably mounted. The horizontal bar 20 extends along the first predefined direction X or parallel thereto.

Due to horizontal sliding, the headlamp beam setter 10 can be positioned in front of one or the other of the frontal headlamps of the vehicle 100.

The horizontal bar 20 is preferably slidable along a second predefined direction Z that is transverse to the first predefined direction X and to the pointing direction Y. In particular, the horizontal bar 20 is vertically slidable relative to the rest of the support 2.

The support 2 preferably comprises one or two columns 21 that extend parallel to the second predefined direction Z. The horizontal bar 20 is arranged transversely to the columns 21 and slidably mounted on them.

According to another embodiment, illustrated in FIG. 1, there are two headlamp beam setters 10 mounted on the support 2. In particular, the two headlamp beam setters 10 are arranged and spaced so as to be positioned in front of a corresponding frontal headlamps of the vehicle 100.

On the support 2 is also mounted a projection surface 4 for projecting images or videos. Preferably, the projection surface 4 is mounted on the columns 21 of the support 2.

According to one aspect of the invention, the projection surface 4 is a screen, for example the display of a computer or of a television set.

According to another aspect of the invention, the projection surface 4 is the display of a multimedia interactive whiteboard.

According to another aspect of the invention, the projection surface 4 is a panel, for example made of high-contrast PVC fabric.

Optical measurement device 3 are also mounted on the support 2 for detecting the distances of two front or rear wheels of the vehicle 100 from the support 2.

According to one embodiment, the optical measurement device 3 comprise two laser meters 3 slidably mounted on the horizontal bar 20.

In particular, one laser meter 3 is configured to detect the distance of the front left wheel (visible in FIG. 1 and indicated with WL), while the other laser meter 3 is configured to detect the distance of the front right wheel (that is not illustrated). It must be recalled that a similar detection may occur with reference to the rear left wheel and the rear right wheel.

In the embodiment illustrated in FIG. 1, each headlamp beam setter 10 is arranged in proximity of one of the laser meters 3.

Alternatively, the optical measurement device 3 comprise two cameras mounted on the horizontal bar 20.

One or more sensors are place on board of the vehicle 100 that may require calibration. For example, in FIG. 1 it is illustrated an optical sensor of a frontal camera 30 placed on board of the vehicle 100.

The support 2 is arranged in front of the test station 50 so that the sensor 30 can acquire images or videos projected onto the projection surface 4.

Each headlamp beam setter 10 comprises a screen 12 and a camera 13. For example, the screen 12 is mounted on the camera 13 by means of a supporting structure, i.e. having a frusto-conical or prismatic shape.

The screen 12 is arranged to show a pattern created by the two-dimensional projection of the light beam emitted by the corresponding headlamp.

The camera 13 is located in front of or behind the screen 12 with respect to the light beam emitted by the headlamp HL. In other words, the camera 13 may be located between the screen 12 and the headlamp HL or the screen 12 may be located between the camera 13 and the headlamp HL.

For example, the screen 12 is made of PMMA or a similar material. The screen 12 may opaque in order to allow the projection of the pattern with a perceivable contrast, in particular when the camera 13 is in front of the screen 12.

Alternatively, when the camera 13 is behind the screen 12, the screen 12 is translucent.

For example, a screen of 30 cm×30 cm may be used.

The camera 13 is oriented in such a way as to acquire an image of the pattern displayed on the screen 12.

Preferably, the headlamp beam setter 10 also comprises a lens 14 or a series of lenses in order to focus the light beam coming from the corresponding headlamp of the vehicle 100.

The camera 13 is preferably located between the screen 12 and the lens 14. In order not to disturb the light beam coming from the headlamp, the camera 13 is preferably located in a lower position or in a higher position with respect to the optical axis of the lens 14.

The light beam coming from the headlamp is collimated by the lens 14, projected on the screen 12 in the form of a pattern, and acquired by the camera 13.

Figure 2:
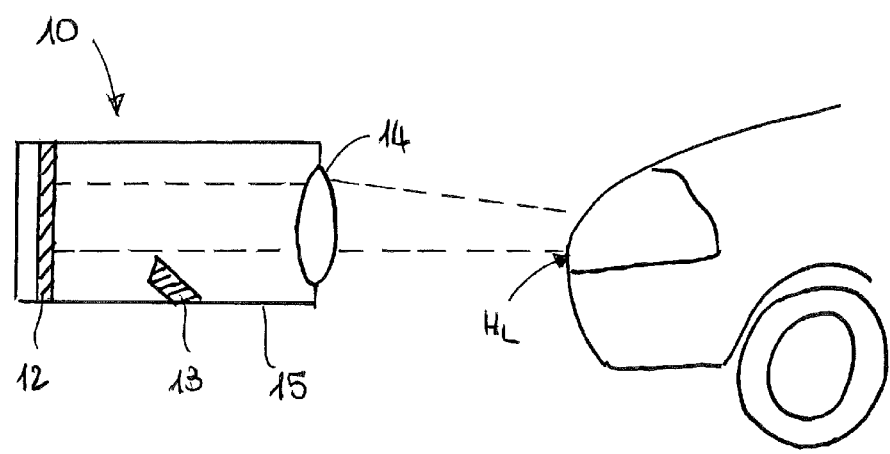
FIG. 2 schematically illustrates a headlamp beam setter of the system of FIG. 1.

The screen 12, the camera 13 and the lens 14 may also be integrated in a box, indicated with number 15 in FIG. 2.

The ADAS calibration system 1 comprises a control unit 5 configured to: receive the distances detected by the laser meters 3 (or in general by the optical measurement device); receive the images of the pattern acquired by the camera 13; and in response to the distances and the images, compute an alignment angle for the headlamp.

The control unit 5 is also configured to command the projection of images or videos for the calibration of the sensor 30 on the projection surface 4.

Also, images of the pattern acquired by the camera 13 may be projected on the projection surface 4. This allows the operator to receive indication on alignment directly from the projection surface 4.

The images or videos for calibrating the sensor 30 are selected from an archive that may be stored in a memory. In particular, the memory contains a plurality of images and/or videos stored by type of sensors.

In accordance with an aspect of the invention, the control unit 5 is configured to adapt or deform the image or video to the size of the projection surface 4.

The control unit 5 is preferably housed in a portable device, generally known in the sector as "scan tool", which can be connected to a vehicle's EOBD diagnostic socket, either wireless or via cable connection.

The memory can be also housed in the same portable device.

Alternatively, the memory may be the memory of a computer or an external memory, i.e. a USB memory connectible directly to the television set.

According to another embodiment (not illustrated), the headlamp beam setter 10 is mounted on a further support that is separated from the support 2 of the ADAS calibration system 1. Preferably, the support 2 and the further support are not integrally connected. The further support of the headlamp beam setter 10 can be a trolley of the known type.

The functioning of the ADAS calibration system according to the present invention is described below.

The vehicle 100 is placed in the test station 50 and the support 2 is brought in front of the vehicle 100 so that the projection surface 4 is arranged substantially transverse to a longitudinal axis of the vehicle 100.

The operator connects the portable device (scan tool) to the EOBD diagnostic socket of the vehicle 100.

The portable device has a display on which a graphical interface is displayed, configured to allow text or instructions to be entered by the operator.

In particular, the operator can select the vehicle 100 to be calibrated, by choosing from different types of vehicle split into brands (manufacturers) and models. The recognition of the vehicle 100 can also be performed automatically or semi-automatically by the scan tool.

The operator then selects the sensor that need to be calibrated, i.e. the optical sensor of the frontal camera 30 placed on board of the vehicle 100.

The laser meters 3 detect the distances of the two front or rear wheels from the support 2 and communicate these data to the control unit 5.

The light beam emitted by the headlamp mat be collimated by the lens 14, projected on the screen 12 in the form of a pattern, and acquired by the camera 13, that communicate these data to the control unit 5.

In response to these data, the control unit 5 commands the projection of an image or video on the projection surface 4, that is specifically intended for the calibration of that optical sensor. In particular, the control unit 5 searches inside the memory the image or video associated to the type of optical sensor to be calibrated.

In addition, an alignment angle for the headlamp is calculated, and optionally displayed on the projection surface 4.

The characteristics and the advantages of the ADAS calibration system for calibrating at least one headlamp, according to the present invention, are clear, as are the advantages.

When calibrating a headlamp beam working as a part of an ADAS system, and specifically the front camera for lane keeping, collision warning, adaptive cruise control, etc., the beam setter is usually put in a calibration mode by means of commands sent to the headlamp ECU by means of an appropriate diagnostic scan tool, which connects to the ECU via the vehicle's diagnostic connector. Such a calibration mode makes the headlamp to project a specific beam pattern, actually changing the shape of the projected beam. The camera of the headlamp beam setter measures the position of these patterns and computes the required correction factors, which are then returned to headlamp ECU by the scan tool.

Thanks to the fact that the single and slidable headlamp beam setter or the two headlamp beam setters are mounted on the support of the ADAS calibration station, their position is controlled by the ADAS calibration system.

Including the headlamp beam setter in the ADAS calibration system that control the other sensors on board of the vehicle allows the headlamp beam setter to receive instructions/information for regulating the optical group of the headlamp, i.e. orientation and/or intensity. This is done quickly, easily and in safe condition for the operator.

The present disclosure may achieve important advantages. For example, the disclosure may allow improving the stiffness of the photovoltaic system and exerting a more effective resistance to the overturning action exerted by the wind. It also makes it possible to extend the life of the system by reducing maintenance interventions.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present invention have been described in detail, it should be understood that the various changes, substitutions, and alterations could be made hereto without departing from the spirit and scope of the present invention.

The invention claimed is:

1. An ADAS calibration system for calibrating at least one headlamp of a vehicle, said ADAS calibration system comprising:
   a support;
   an optical measurement device configured to detect distances of two wheels of the vehicle from the support, said optical measurement device being mounted on the support;
   a projection surface for projecting images or videos, said projection surface being mounted on the support;
   at least one headlamp beam setter comprising:
      a screen configured to show a pattern created by a two-dimensional projection of a light beam emitted by the headlamp substantially arranged in front of the headlamp beam setter; and
      a camera configured to acquire images of the pattern shown on said screen; and
   a control unit configured:
      to receive from said optical measurement device the distances detected for the two wheels and from said camera the images of the pattern; and
      in response to the distances detected for the two wheels and the images of the pattern, to compute an alignment angle for said headlamp.

2. The ADAS calibration system according to claim 1, wherein said at least one headlamp beam setter is mounted on said support and horizontally slidable thereon.

3. The ADAS calibration system according to claim 2, wherein said support comprises a horizontal bar on which said headlamp beam setter is slidably mounted along a first predefined direction.

4. The ADAS calibration system according to claim 3, wherein said horizontal bar is slidable along a second predefined direction that is transverse to the first predefined direction.

5. The ADAS calibration system according to claim 1, further comprising a further support for said headlamp beam setter that is separated from said support such that the support and the further support are not integrally connected.

6. The ADAS calibration system according to claim 1, further comprising two headlamp beam setters mounted on said support.

7. The ADAS calibration system according to claim 6, in which said support comprises a horizontal bar on which the two headlamp beam setters are mounted.

8. The ADAS calibration system according to claim 1, wherein the camera is located in front of or behind said screen with respect to the light beam emitted by the headlamp.

9. The ADAS calibration system according to claim 1, wherein said at least one headlamp beam setter further comprises at least one lens for focusing the light beam coming from the headlamp before reaching said screen.

10. The ADAS calibration system according to claim 9, wherein said at least one headlamp beam setter comprises a box housing said screen, said camera and said at least one lens.

11. The ADAS calibration system according to claim 9, wherein the camera is located in a lower position or in a higher position with respect to an optical axis of said at least one lens.

12. The ADAS calibration system according to claim 1, wherein said optical measurement device comprise two laser meters slidably mounted on the support.

13. The ADAS calibration system according to anyone claim 1, wherein said optical measurement device comprise two cameras mounted on the support.

14. The ADAS calibration system according claim 1, wherein the projection surface is a second screen or a panel.

15. The ADAS calibration system according to claim 1, wherein the control unit is also configured to command projection of images or videos for calibration of one or more optical sensors placed on board of the vehicle.

16. The ADAS calibration system according to claim 1, wherein said control unit is configured to communicate with an EOBD diagnostic socket of the vehicle either wireless or via cable connection.

* * * * *